United States Patent [19]

Herbst

[11] Patent Number: 5,043,050
[45] Date of Patent: Aug. 27, 1991

[54] ELECTROLYTIC TREATMENT APPARATUS

[76] Inventor: Robert J. Herbst, P.O. Box 10726, Denver, Colo. 80210

[21] Appl. No.: 569,637

[22] Filed: Aug. 20, 1990

[51] Int. Cl.⁵ .................... C25B 9/00; C25B 11/02; C25C 7/00
[52] U.S. Cl. .................................. 204/272; 204/275
[58] Field of Search ............... 204/275, 272, 269, 242, 204/289

[56] References Cited

U.S. PATENT DOCUMENTS

| 820,113 | 5/1906 | Hinkson | 204/272 |
| 2,864,750 | 12/1958 | Hughes, Jr. et al. | 204/275 X |
| 3,972,795 | 8/1976 | Goens et al. | 204/269 |
| 4,175,026 | 11/1979 | Houseman | 204/272 |
| 4,790,923 | 12/1988 | Stillman | 204/269 |

*Primary Examiner*—Donald R. Valentine
*Attorney, Agent, or Firm*—Edmond T. Patnaude

[57] ABSTRACT

A device for precipitating metals out of a liquid by applying an electric field to a flowing liquid makes use of two spaced apart insulating plates provided with mutually facing grooves, and two pieces of metal flat stock sealably mounted between the plates in spaced apart relationship. The liquid flows into and out of the space between the pieces of flat stock through inlet and outlet openings in one of the insulating plates. The pieces of flat stock function as electrodes and are respectively connected to the output terminals of an electric power supply.

4 Claims, 2 Drawing Sheets

ELECTROLYTIC TREATMENT APPARATUS

The present invention relates in general to the electrolytic treatment of liquids, and it relates in particular to new and improved apparatus for electrolytically treating aqueous solutions to cause dissolved solids to precipitate out of the solution.

BACKGROUND OF THE INVENTION

In U.S. Pat. Nos. 4,293,400, 4,378,276 and 4,872,959 there are described devices for applying an electric field to a liquid which flows between electrodes incorporated in the devices. In these devices, the electrodes are metal tubes or pipes whose sizes are predetermined by the sizes of pipe which is commercially available. It will be appreciated that the spacing between the electrodes is critical in order to optimize the treatment process, but since the electrode diameter is dictated by the pipe sizes which are available, optimum spacing cannot always be provided economically because of the increased cost of special pipe sizes and the need to use non-standard fittings. For example, the cost of a non-standard pipe assembly is commonly five times the cost of an assembly using off-the shelf pipes and fittings.

Another problem with the devices described in the referent patents is the difficulty and expense in precisely spacing the tubular electrodes from one another throughout the length of the device. If the spacing is less at one or more locations along the electrodes, more current will be conducted through the liquid at those locations resulting in a greater sacrifice in the pipe metal at those locations than at other places along the electrodes. Consequently, pipe life is decreased, and in addition, the efficiency of the process is reduced since the liquid will be primarily treated at the locations where the electrode spacing is least rather then throughout the overall length of the device. This makes the percentages of removed impurities per pipe less and the amount of impurities removed for a given amount of power less. In fact, any appreciable variation in the spacing between the electrodes dramatically increases the cost per gallon of treating the liquid.

The electrolytic devices described in the referent patents provide a helical flow path between the tubular electrodes which allows more metal surface contact between the liquid and the electrodes and optimizes the dwell time and processing surface area of the electrodes. However, the helical flow path has the disadvantage of increasing the flow resistance and the necessary operating pressure of the system resulting in an increased operating cost and the need for more expensive pumps and fittings to withstand the higher operating pressures.

Another disadvantage of the prior art tubular electrode systems is one of maintenance because disassembly requires that the pipes be unscrewed which is made difficult when corrosion has occurred. Also, since sacrificing does not always occur uniformly, it is sometimes very difficult to withdraw the inner electrodes from the outer electrodes.

In order to increase the capacity of the treatment devices which use tubular electrodes, attempts have been made to use larger diameter electrodes, but this has proven to be uneconomical because the added cost of the electrodes more than offsets the benefits provided by the increased volume.

SUMMARY OF THE INVENTION

Briefly, there is provided in accordance with the present invention a new and improved device for the electrolytic treatment of liquid. Unlike the tubular electrodes of the prior art, the electrodes of the present invention are formed of flat metal straps which are sealably mounted between a pair of insulating members. One of the electrodes is generally U-shaped and is surrounded by the other electrode, and liquid inlet and outlet ports are provided in one or both of the insulating members whereby the liquid flows through the space between the electrodes.

In a preferred embodiment, the insulating members are flat plates and the outer electrode is in the shape of a hollow rectangular polygon. The elongate sides of the rectangular electrode lie in close proximity to the elongate sides of the inner, U-shaped electrode and are maintained in equally spaced relationship throughout the lengths thereof by the insulating members.

GENERAL DESCRIPTION OF THE DRAWINGS

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 4:
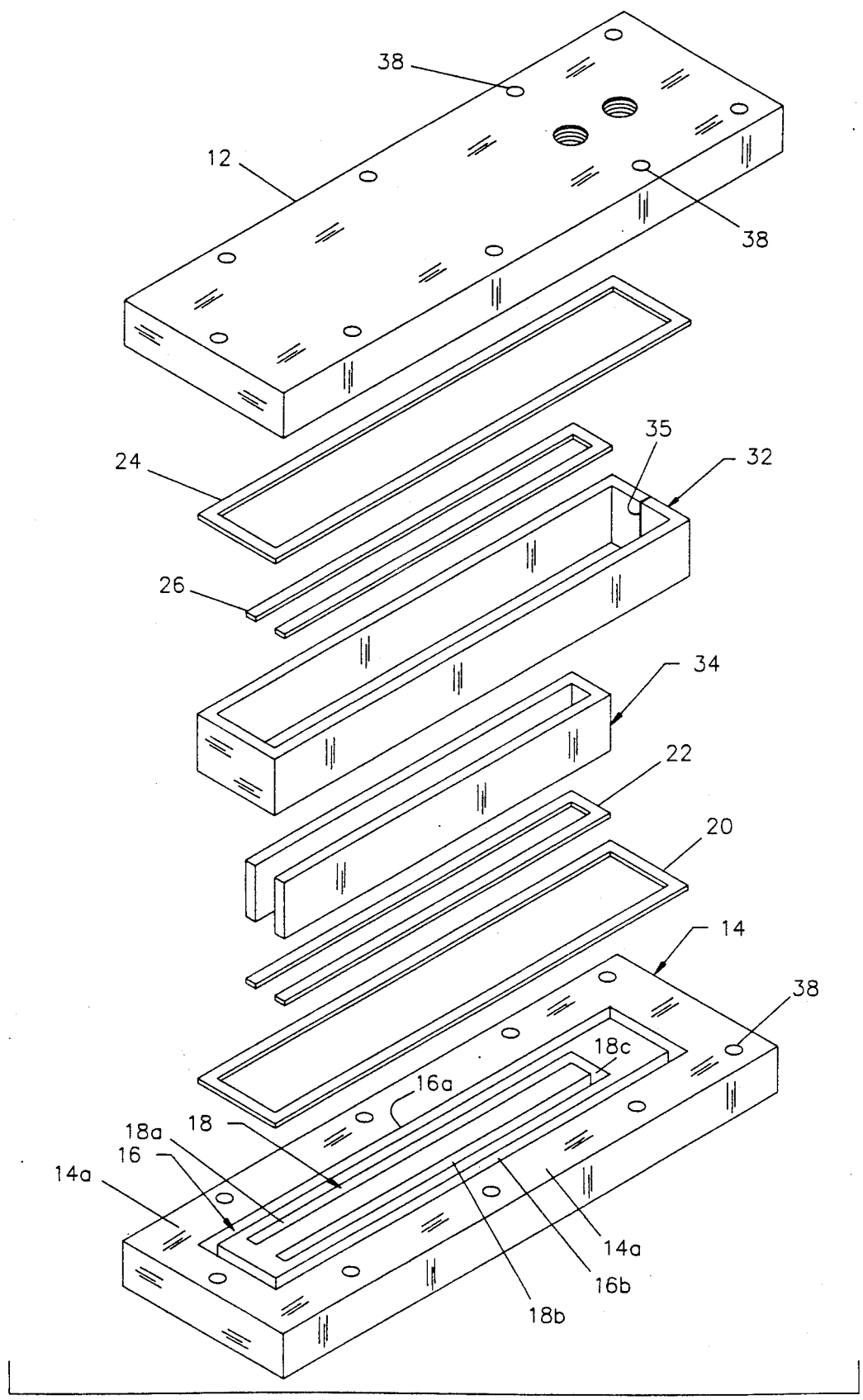
FIG. 4 is an exploded isometric view of the electrolytic treatment device shown in FIG. 1.

Referring to the drawings, a device for electrolytically treating a liquid to precipitate out of the liquid solids dissolved therein comprises an upper support plate member 12 formed of an insulating material such as plastic sheet stock and a lower support plate member 14 also formed of an insulating material such as plastic sheet stock. The plates 12 and 14 are sufficiently thick to be rigid, and the lower plate 12 may be seen in FIG. 4 to have a pair of grooves 16 and 18 provided in the upper face 14a thereof. The groove 16 is rectangular and surrounds the inner groove, which is U-shaped having elongate linear side portions 18a and 18b and an interconnecting end portion 18c. The groove 16 has linear side portions 16a and 16b which are parallel to the side portions 18a and 18b of the groove 18. A pair of complimentary grooves (not visible in the drawings) are provided in the lower face 12a of the upper support plate 12.

The side portions 16a and 16b of the outer grooves are precisely spaced from the side portions 18a and 18b of the inner V-shaped grooves 18.

A first set of resilient sealing gaskets 20 and 22 are fitted into the bottoms of the grooves 16 and 18 respectively, and a similar set of resilient sealing gaskets 24 and 26 are fitted into the bottoms of the grooves in the bottom face of the support member 12.

The top and bottom edges of a first electrode member 32 formed from metal strapping are tightly fitted into the outer grooves 16 in the support members 12 and 14 over the gaskets 20 and 24. In like manner, the top and bottom edges of a second electrode member 34, which is also formed from metal strapping, are tightly fitted into the U-shaped inner grooves 18 in the support members 12 and 14 over the gaskets 22 and 26. As shown in the drawings, the electrodes 32 and 34 correspond in cross-sectional configuration to the shapes of the grooves 16 and 18; wherefore, the outer electrode 32 is rectangular in cross section and the inner electrode 34 is U-shaped in cross-section. The outer electrode 32 sealably encloses the space therein, and if formed from a length of stock metal strap, the respective ends are abutted and welded together as shown at 35. The precise location of the weld is not critical, but the weld should not be located in the area along the sides where the two electrodes are closest together since metal is removed from the electrodes in this region during operation of the device.

Figure 1:
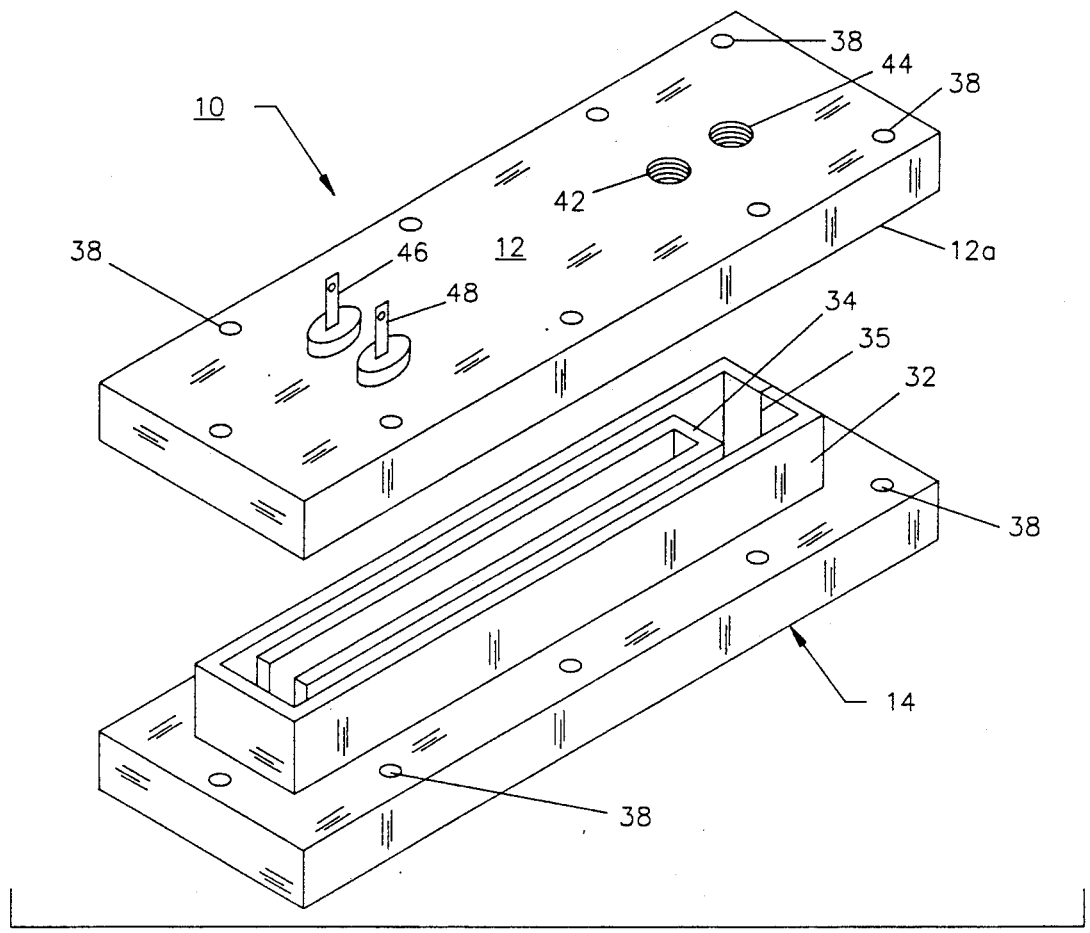
FIG. 1 is an isometric view of a partially disassembled electrolytic treatment device embodying the present invention.
Figure 2:
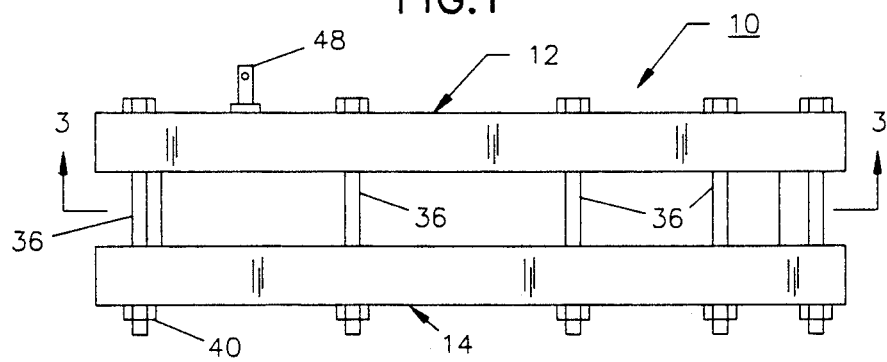
FIG. 2 is an elevational view of the device shown in FIG. 1.
Figure 3:
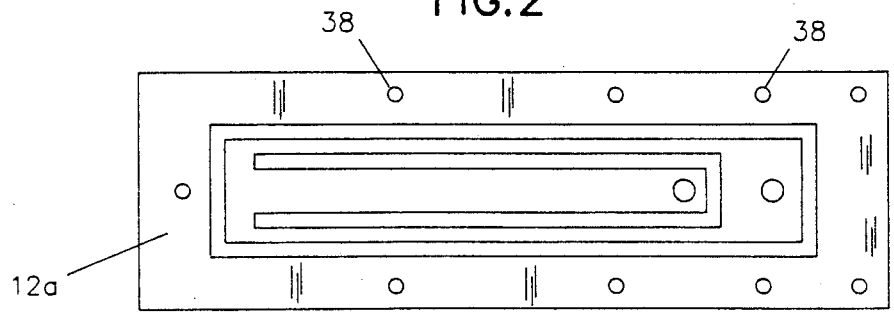
FIG. 3 is a cross-sectional view taken along the line 3—3 of FIG. 2.

As shown in FIG. 2, a plurality of bolts 36 extend through a plurality of mutually aligned holes 38 in the support plates 12 and 14, and the plates 12 and 14 and the electrodes 32 and 34 are held in assembled, clamped relationship by a plurality of nuts 40 which are threadedly fastened to the bolts 36.

A pair of internally threaded liquid inlet and liquid outlet ports 42 and 44 extend through the upper support plate 12 and respectively open into the space within the electrode 34 near the closed end thereof and the space between the closed end of the inner electrode 34 and the corresponding end portion of the outer electrode 32. The liquid to be treated may be pumped through the space between the electrodes 32 and 34 in either direction between the inlet and outlet ports 42 and 44.

During use of the device 10, an electric field is developed between the electrodes as the liquid to be treated flows in and out of the device through the ports 41 and 44. To this end, a pair of electric terminals 46 and 48 are respectively connected to the electrodes 32 and 34. The terminals 46 and 48 are mounted in sealing relationship to the upper support plate 12 and extend through openings therein into electric contact with the electrodes 32 and 34. The terminals 46 and 48 are adapted to be connected to a suitable source of electric power which may be either AC or DC although DC is preferred. Preferably, a DC power source is used with the electrode 34 being operated as the cathode. In some applications it is necessary to occasionally reverse the polarity of the electrodes 32 and 34 to clean the cathode of material which may have been deposited by the plating action.

The water is treated primarily as it passes through the space between the rectilinear side portions 16a, 16b, 18a and 18b of the two electrodes. Since the grooves 16 and 18 are precisely located relative to one another and since the height dimension of the electrodes is relatively small, the distance between the side portions 16a, 16b, 18a and 18b does not vary.

The electrolytic treatment apparatus of the present invention has been found to have many advantages over the devices of the prior art. Because metal strapping is available commercially in a wide range of thicknesses, lengths and widths, the device of the present invention can be easily dimensioned for optimum performance in each particular application. Thicker strapping can be used, for example, where increased electrode life and decreased down time and labor is of the particular importance. Also there is no need for special fittings in the device of the present invention, thereby resulting in reduced manufacturing expense.

In the event the flow path through the device 10 becomes plugged, it is a simple matter to disassemble the support plates and electrodes to wash out the material which plugs the space between the electrodes.

In order to increase the capacity or flow rate of the device 10, it is only necessary to increase the width of the straps used for the electrodes. Therefor, it is not necessary to maintain an invention of many different parts since the same size support plates are used for treatment devices having a witdth range of different flow rates.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed is:

1. Electrolytic treatment apparatus, comprising in combination
    a first member formed of an insulating material and having a surface provided with a plurality of grooves,
    a second member formed of an insulating material and having a surface provided with a plurality of grooves,
    a first one of said grooves in each of said members being continuous and a second one of said grooves in each of said members being located interiorly of said first one of said grooves,
    said first and second members being spaced apart with said surfaces being disposed in face to face relationship,
    a first continuous metal electrode having one edge thereof sealably mounted in said first one of said grooves in said first member and an opposite edge thereof sealably mounted in said second one of said grooves in said second member,
    a second metal electrode having one edge sealably mounted in said second one of said grooves in said first member and having an opposite edge sealably mounted in said second one of said grooves in said second member interiorly of said first metal electrode,
    said second metal electrode being surrounded by said first continuous metal electrode,
    a liquid inlet port extending through one of said first and second members and opening into the space between said grooves,
    a liquid outlet port extending through one of said members and opening into the space between said grooves, and
    electrical connector means for connecting said metal electrodes across a voltage source.

2. Electrolytic treatment apparatus according to claim 1, wherein
    said first one of said grooves is rectangular,
    said second one of said grooves is U-shaped,
    one of said liquid inlet and outlet ports opens into the space within said second one of said grooves, and
    the other of said liquid inlet and outlet ports opens into the space between said first one of said grooves and said second one of said grooves.

3. Electrolytic treatment apparatus according to claim 2 wherein
    said first metal electrode is formed of a metal strap having ends which are sealed together.

4. Electrolytic treatment apparatus according to claim 1 wherein
    said first and second metal electrodes have linearly extending spaced apart sides.

* * * * *